(12) United States Patent
Sarel et al.

(10) Patent No.: US 8,289,341 B2
(45) Date of Patent: Oct. 16, 2012

(54) TEXTURE SAMPLING

(75) Inventors: Uzi Sarel, Zichron-Yaakov (IL); Piotr Rozenfeld, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 616 days.

(21) Appl. No.: 12/493,900

(22) Filed: Jun. 29, 2009

(65) Prior Publication Data

US 2010/0328309 A1 Dec. 30, 2010

(51) Int. Cl.
*G06T 1/00* (2006.01)
*G06T 15/00* (2006.01)
*G06T 15/04* (2006.01)
*G06T 15/50* (2006.01)
*G06T 1/20* (2006.01)
*G06T 15/80* (2006.01)

(52) U.S. Cl. ........ 345/582; 345/418; 345/501; 345/522; 345/552

(58) Field of Classification Search .......... 345/418, 345/426, 428, 582–583, 501, 519–522, 530, 345/552; 382/285, 307
See application file for complete search history.

(56) References Cited

U.S. PATENT DOCUMENTS

| | | | |
|---|---|---|---|
| 7,623,136 B1 | 11/2009 | Chen et al. | |
| 7,782,334 B1 * | 8/2010 | Kilgard et al. | 345/582 |
| 7,859,548 B1 * | 12/2010 | Lindholm | 345/582 |
| 2006/0098018 A1 * | 5/2006 | Tarditi et al. | 345/505 |
| 2006/0098019 A1 * | 5/2006 | Tarditi et al. | 345/505 |
| 2008/0284781 A1 | 11/2008 | Wenger | |
| 2009/0089763 A1 | 4/2009 | Chen et al. | |

FOREIGN PATENT DOCUMENTS

| | | |
|---|---|---|
| CN | 1928918 A | 3/2007 |
| GB | 2471926 A | 1/2011 |

OTHER PUBLICATIONS

Non-Final Office Action for Russian Patent Application No. 2010126453, no English translation Mailed Aug. 11, 2011, 6 Pages.
Stephen Procter, Search Report under Section 17, Aug. 19, 2010, Application No. GB1007971.3, 2 pages, United Kingdom Intellectual Property Office, Newport, Wales.
Non-Final Office Action for UK Patent Application No. GB1007971.3, Mailed Sep. 8, 2011, 2 Pages.
Non-Final Office Action for UK Patent Application No. GB1007971.3, Mailed Aug. 20, 2010, 10 pages.
Office Action received for China Patent Application No. 201010220862.7, mailed on Feb. 13, 2012, 7 pages of Office Action and 9 pages of English Translation.

* cited by examiner

*Primary Examiner* — Wesner Sajous
(74) *Attorney, Agent, or Firm* — Ryder, Lu, Mazzeo and Konieczny, LLC

(57) ABSTRACT

A texture sampler is implemented using a shader language. The shader compiler is used to compile the texture sampler to a target machine based on sampler state, sampler operation, and other static factors input values provided to the texture sampler. The shaders such as a vertex shader, geometry shader, pixel shader, hull shader, domain shader, and a compute shader may call one or more texture samplers while the shaders are invoked. The one or more texture samplers, which are a piece of software code may generate texture samples from the texture data and provide such texture samples to the shaders. The shaders generate shading effects on graphics elements using a texture samples. The graphics elements along with the shading effects are then rendered on a display device.

26 Claims, 5 Drawing Sheets

TEXTURE SAMPLING

BACKGROUND

Texture generally refers to images comprising repeated patterns that may be used to wrap the graphic patterns. The texture data may be sampled using texture sampling techniques based on Nyquist criteria. Texture sampling techniques are becoming increasingly more complex and widely used. The texture sampling techniques may include point sampling, bi-linear filtering, tri-linear filtering, anisotropic filtering, anti-aliasing and other similar techniques. The texture sampling is increasingly used, for example, by vertex shader, geometry shader, and pixel shader.

Also, the complexity and usage of such texture sampling techniques is increasing and with that the complexity of the hardware used to perform texture sampling is ever increasing. There are at least few applications that may require use of texture sampling techniques that may not need or have direct access to the hardware device. Also, the existing hardware devices may not fully support complex texture sampling operations or the existing hardware devices may not perform complex texture sampling operations efficiently.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques to perform texture sampling using a texture sampler implemented with a shader language. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
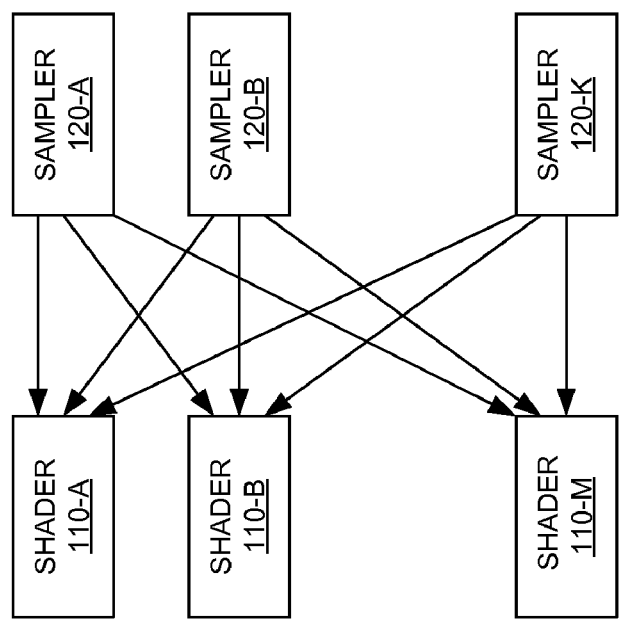
FIG. 1 illustrates a graphics processing technique that uses a texture sampler realized using a shader language in accordance with one embodiment.

An embodiment of a many-to-many relationship shared between multiple shaders and texture samplers is illustrated in FIG. 1. In one embodiment, the relationship diagram may comprise 'M' shaders 110-A to 110-M and 'K' texture samplers 120-A to 120-K may support various sampling operations ('N', sampling operations, for example) with various sampler states ('p' sampler states, for example). In one embodiment, the texture sampler 120 may be configured with a sampler-state and may receive a sample operation to be performed based on the sampler-state. In one embodiment, the shader 110-A may retrieve texture samples from the texture samplers 120-A to 120-K. In other embodiment, the shader 110-A may retrieve texture samples from, for example, texture samplers 120-B, 120-D, 120-G, and 120-J. In one embodiment, the shaders 110-A to 110-M may represent, for example, vertex, geometry, hull, domain, pixel, or compute shaders. In one embodiment, the shader 110-A many include multiple sample-states (SS), which may be used for sampling and the shader 110-A, for example, may perform multiple sample operations using a specific samplerstate. In one embodiment, a sampler-state may have separate logic for the sampling operations. At compilation time, the sampler-state may be added to the sampler-state (SS) to get an optimal code for the specific sampler-state and the sampler operation. In one embodiment, the texture samplers 120-A to 120-K may represent texture sampler operations that may implement a subset of texture-sampler supporting sampling operations and sampler-states.

In one embodiment, each shader 110 may retrieve texture samples generated by one or more texture samplers 120. In one embodiment, the texture samplers 120-A to 120-K may be implemented offline using a shader language such as assembly, Cg, GLSL, HLSL, and other shader languages. In one embodiment, the texture samplers 120 may be compiled during creation of the shaders 110, or during orthogonal sampler-state object creation, or on demand at a later point in time after the creation phase. In one embodiment, a sampler binary (SS-BIN) may be created and may be used by the shaders 110 while the shaders 110 require texture samples.

In one embodiment, the shaders 110 and the texture samplers 120 may be used, for example, in 3D graphics programmable pipeline. In one embodiment, the 3D graphics programmable pipeline may comprise Direct3D10 (D3D10), Direct3D11 (D3D11), or other such pipeline stages of a DirectX application program interface (API) available from Microsoft® Corporation or OpenGL pipeline stages of a cross-platform API available from Silicon Graphics Inc. However, the texture samplers 120 may be used by any shader in other environments as well.

Figure 2:
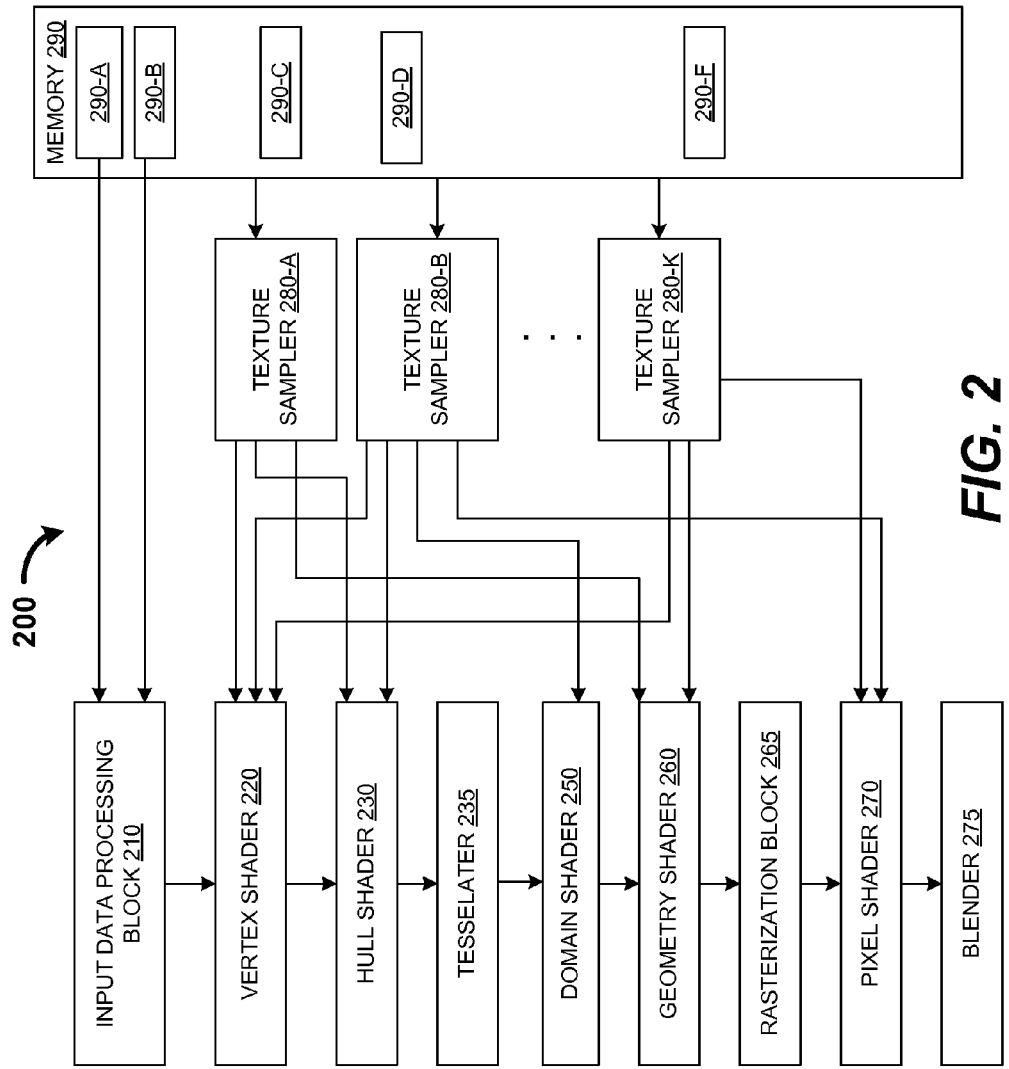
FIG. 2 illustrates 3-dimensional pipeline stages of a graphics processing technique using texture samplers realized using a shader language in accordance with one embodiment.

An embodiment of a three dimensional (3D) graphics programmable pipeline, which may use a texture sampler implemented using high-level shader language, is illustrated in FIG. 2. In one embodiment, 3D graphics programmable pipeline 200 may comprise stages such as an input data processing block 210, a plurality of shaders such as a vertex shader 220, hull shader 230, domain shader 250, geometry shader 260, and pixel shader 270, a tessellator 235, a rasterization block 265, a blender 275, texture samplers 280-A to 280-K, and a memory 290.

In one embodiment, the programmable pipeline stages may generate graphics for real time applications such as gaming, for example. In one embodiment, the pipeline stage 200 may represent D3D11 of a DirectX application program interface (API) available from Microsoft® Corporation.

In one embodiment, the input data processing block 210 may generate data units using index data and vertex data stored, respectively, in buffers 290-A and 290-B of the memory 290. In one embodiment, the vertex data may represent vertices of triangles, points, lines, and other similar data. In one embodiment, the input data processing block 210 may provide the data units to the vertex shader 220. In one embodiment, the input data processing block 210 may compose the geometric data using vertex and index data stored in the buffers 290-A and 290-B before providing the geometric data to the vertex shader 220 and the geometry shader 260.

In one embodiment, the vertex shader 220 may process the vertices that are received from the input processing block 210 using the texture samples generated by the texture samplers 280-A to 280-K. In one embodiment, the vertex shader 220 may use the texture samples generated by any one or some or all the texture samplers 280-A to 280-K. In one embodiment, the vertex shader 220 may generate a single output vertex, which may be processed using the texture samples after receiving a single input vertex. In one embodiment, the vertex shader 220 may perform transformations to provide special effects such as lighting and skinning to the input vertex. In one embodiment, the vertex shader 220 may perform mathematical operations to change the color, texture, or position of the input vertex. In one embodiment, the vertex shader 220 may be implemented using shader languages such as assembly language, C for graphics (Cg) language, OpenGL shader language (GLSL), or high level shader language (HLSL), or any other shader languages.

In one embodiment, the hull shader 230 may receive patch control points and may prepare the patch control points for the fixed function tessellator 235. In one embodiment, the hull shader 230 may receive texture samples from one or more of texture samplers 280-A to 280-K. In one embodiment, the hull shader 230 may receive texture samples from the texture samplers 280-A and 280-B. In one embodiment, the hull shader 230 may be implemented using shader languages. In one embodiment, the tessellator 235 may sub-divide the patch based on control inputs from the hull shader 230 and may pass the results of the tessellation to the domain shader 250. In one embodiment, the domain shader 250 may manipulate the generated vertices to conform the vertices to a shape or perform displacement mapping using the inputs from the tessellator block 235 and the texture samples from one or more of the texture samplers 280-A to 280-K. In one embodiment, the domain shader 250 may use texture samples provided by the texture sampler 280-B. In one embodiment, the domain shader 250 may provide the results to the geometry shader 260 or the rasterization block 265. In one embodiment, the domain shader 250 may be implemented using high level shader languages.

In one embodiment, the geometry shader 260 may generate shaded primitives in response to receiving whole primitives from the vertex shader 220 or the domain shader 250 and texture samples generated one or more of the texture sampler 280-A to 280-K. In one embodiment, the geometry shader 260 may receive texture samples generated by the texture samplers 280-A and 280-K. In one embodiment, the whole primitives may comprise a plurality of vertices. In one embodiment, the geometry shader 260 may create zero or more shaded primitives in response to receiving the plurality of vertices and texture samples as inputs.

In one embodiment, the plurality of vertices may comprise three vertices of a triangle, or two vertices of a line, or a single vertex of a point along with adjacency information as inputs and may generate zero or more shaded vertices as outputs. In one embodiment, the geometry shader 260 may perform operations such as point stripe generation, geometry tesselation, and shadow volume extrusion to generate shaded primitives. In one embodiment, the geometry shader 260 may compile one or more of the texture samplers 280 and then call the texture samplers 280-A to 280-K to get texture samples from the texture data values stored in the buffer 290-D, for example. In one embodiment, the geometry shader 260 may be programmed using Assembly, Cg, HLSL, and GLSL languages.

In one embodiment, the rasterization block 265 may receive vertices (vector graphics information) from the vertex shader 220 and the geometry shader 260 and generate raster image, which may include pixels or dots that may be displayed on a display device. In one embodiment, the rasterization block 265 may perform rasterization techniques such as transformations, clipping, scan conversion, culling, texture filtering, and other techniques. In one embodiment, the rasterization block 265 may provide the pixels to a pixel shader 270 for processing the raster image.

In one embodiment, the pixel shader 270 may perform rich shading techniques on the raster image to generate per-pixel outputs. In one embodiment, the pixel shader 270 may perform techniques such as per-pixel lighting and related effects such as bump mapping, color toning, shadows, specular highlights, and translucency to provide crisp and more realistic images. In one embodiment, the pixel shader 270 may be programmed using Assembly, Cg, HLSL, and GLSL languages, or other similar languages. In one embodiment, the pixel shader 270 may receive pixel data from the rasterization block 265 and texture samples from one or more texture samplers 280-A to 280-K before generating shading effects. In one embodiment, the pixel shader 270 may receive texture samples from texture samplers 280-B and 280-K. In one embodiment, the pixel shader 270 may receive the texture data values directly from the buffer 290-F as well. In one embodiment, the output of the pixel shader 270 may be provided to the blender 275 for further processing.

In one embodiment, the texture samplers 280-A to 280-K may sample the texture data values stored in the texture buffers 290-C, 290-D, and 290-F, and other buffers. In one embodiment, the texture samplers 280-A to 280-K may be implemented using a shader language used to implement the shaders 220, 230, 250, 260, and 270. Such an approach may allow a complex texture sampling function to be implemented as a piece of software code, which may match with a sampler state. In one embodiment, the texture samplers 280-A to 280-K may be implemented using a Cg, or GLSL, or HLSL languages. In one embodiment, the texture samplers 280-A to 280-K may be implemented using high level shader languages during an offline phase. In one embodiment, the texture samplers 280-A to 280-K may be compiled using the shader compiler during a preparation phase to generate a binary of the sampler implemented using shader language. In one embodiment, one or more of the texture sampler binary files may be called by the shaders 220, 230, 250, 260, and 270, while the shaders 220 to 270 are invoked. In one embodiment, one or more of the texture samplers 280-A to 280-K may be compiled during creation of the shaders 220, 230, 250, 260, and 270, during orthogonal sampler-state object creation, or on demand at a later point in time after the creation phase.

In one embodiment, the texture samplers 280-A to 280-K may perform operations such as resolving the level of details (LOD), determining the samples, resolving texel addresses, fetching samples, and merging samples. In one embodiment, the operations of the texture samplers 280-A to 280-K may be implemented using shader language. In one embodiment, resolving the level of details may determine the mipmaps, which identify the area from which samples are to be selected. In one embodiment, resolving the texel addresses may determine the location from which the samples are to be fetched. In one embodiment, the texture samplers 280-A to 280-K may support sampling techniques such as point sampling, bi-linear sampling, trilinear sampling, and anisotropic filtering. In one embodiment, the texture samplers 280-A to 280-K implemented using a shader language to match the sampler state of the shaders 220 to 270 may improve the speed of operation of texture sampling compared to a texture sampler implemented using a generic software based texture sampling technique.

In one embodiment, the texture samplers 280-A to 280-K may be used to provide the texture samples to the vertex shader 220, the hull shader 230, the domain shader, the geometry shader 260, and the pixel shader 270. In one embodiment, the texture samplers 280-A to 280-K implemented using the shader language, may be compiled during creation of the vertex shader 220 or during the creation of the sampler-state object. In one embodiment, the texture samplers 280-A, 280-B, and 280-K may be called by the vertex shader 220 while the vertex shader 220 is invoked. In one embodiment, the texture samplers 280-A and 280-B may be called by the hull shader 230 while the hull shader 230 is invoked. In one embodiment, the texture sampler 280-B may be called by the domain shader 250 while the domain shader 250 is invoked. In one embodiment, texture samplers 280-B and 280-K may be called by the geometry shader 260 while the geometry shader 260 is invoked and the texture samplers 280-B and 280-K may be called by the pixel shader 270 while the pixel shader 270 is invoked.

Such an approach may allow a complex texture sampling function to be implemented as a piece of software code, which may match with a sampler state of the shaders 220, 230, 250, 260, and 270, or match an orthogonal sampler-state. In one embodiment, the texture samplers 280 implemented using a shader language to match the sampler state of the shaders 220, 230, 250, 260, and/or 270 may improve the speed of operation by a factor of N compared to a texture sampler implemented using a generic software based texture sampling technique. In one embodiment, the texture samplers 280 implemented using the shader language may improve the performance by N=KX compared to a generic software based texture sampling technique with the performance of the generic software based texture sampling being X and K is a positive integer value.

Figure 3:
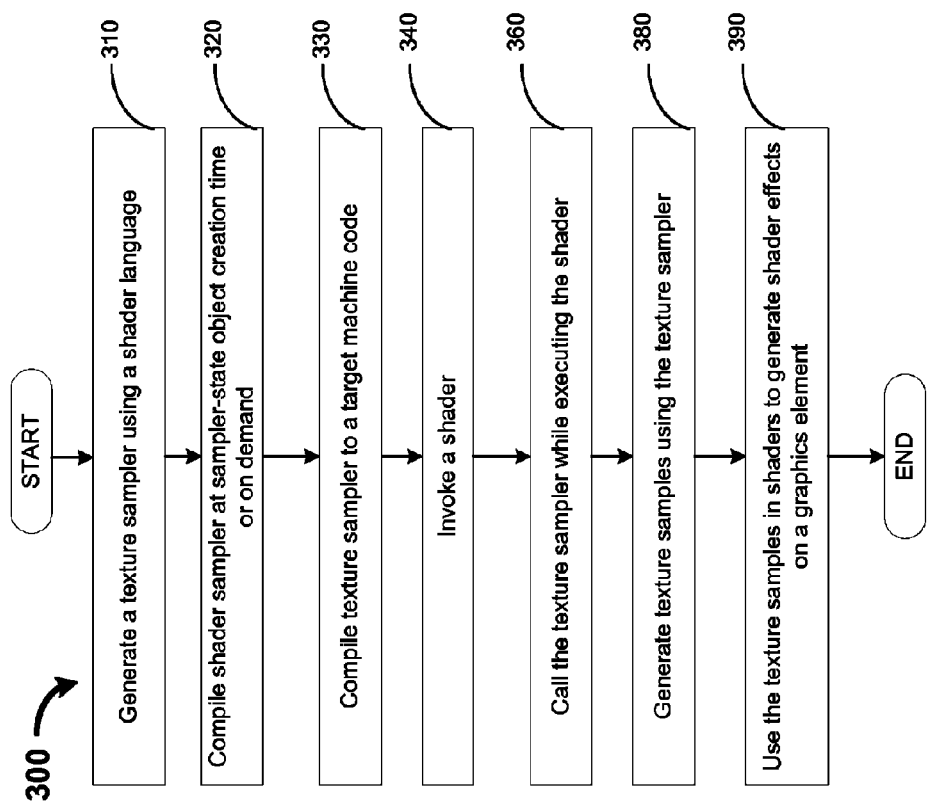
FIG. 3 is a flow chart, which illustrates a texture sampler realized using a shader language in accordance with one embodiment.

A flow-chart 300 depicting the texture samplers 280 realized using a high-level shader language is illustrated in FIG. 3. In block 310, the texture samplers 280-A to 280-K may be generated using a shader language. In one embodiment, the texture samplers 280-A to 280-K may be developed using shader languages such as assembly, Cg, HLSL, or GLSL. In one embodiment, the texture samplers 280-A to 280-K may be generated off-line, for example, while developing a driver module.

In block 320, the shader-samplers used to generate the texture samplers 280-A to 280-K may be compiled at sampler-state object creation time. In other embodiments, the shader-samplers may be created on demand. In one embodiment, a specific sample operation may be created on demand if the sample operation may be required for a draw command, for example.

In block 330, the texture samplers 280-A to 280-K may be compiled to a target machine code using a high-level shader compiler. In one embodiment, the texture samplers 280-A to 280-K may be compiled to a target machine code using a target machine compiler. In one embodiment, the texture sampler 280-A, 280-B, and 280-K may be compiled to a target machine using a high-level vertex shader compiler. Similarly, one or more of the texture samplers 280-A to 280-K may be compiled to a target machine code using high-level shader compilers of the shaders 230 to 270.

In block 340, the shaders 220 to 270 may be invoked. In one embodiment, the shaders such as the vertex shader 220, the hull shader 230, the domain shader 250, the geometry shader 260, and the pixel shader 270 may be invoked.

In block 360, one or more texture samplers 280-A to 280-K may be called by a shader. In one embodiment, the texture samplers 280-A, 280-B, and 280-K in response to being called from the vertex shader 220 may perform sampling operation and may generate texture samples. In one embodiment, the hull shader 230 may call the texture samplers 280-A and 280-B, the domain shader 250 may call the texture sampler 280-B, the geometry shader 260 may call the texture samplers 280-A and 280-K, and the pixel shader 270 may call the texture samplers 280-B and 280-K.

In block 380, the texture samplers 280-A to 280-K may generate texture samples using the texture data stored in the texture buffers within the memory 190. In one embodiment, the texture sampler 280-A may perform sampling operation to generate texture samples using the texture data stored in one or more texture buffers 290-C to 290-F, for example. In one embodiment, the texture sampler 280-B may perform sampling operation to generate texture samples using the texture data stored in the texture buffer 290-D and may provide the texture samples to the pixel shader 270.

In block 390, the texture samples generated by the texture samplers 280-A to 280-K may be used by the shaders 220 to 270 to create a shader effect on the graphics elements. In one embodiment, the vertex shader 220 may receive single vertex value and create a shader effect on the vertex. In one embodiment, the geometry shader 260 may receive whole primitives and may create a shader effect on the whole primitives. In one embodiment, the pixel shader 270 may generate shading effect on the pixels or dots (or raster image).

Figure 4:
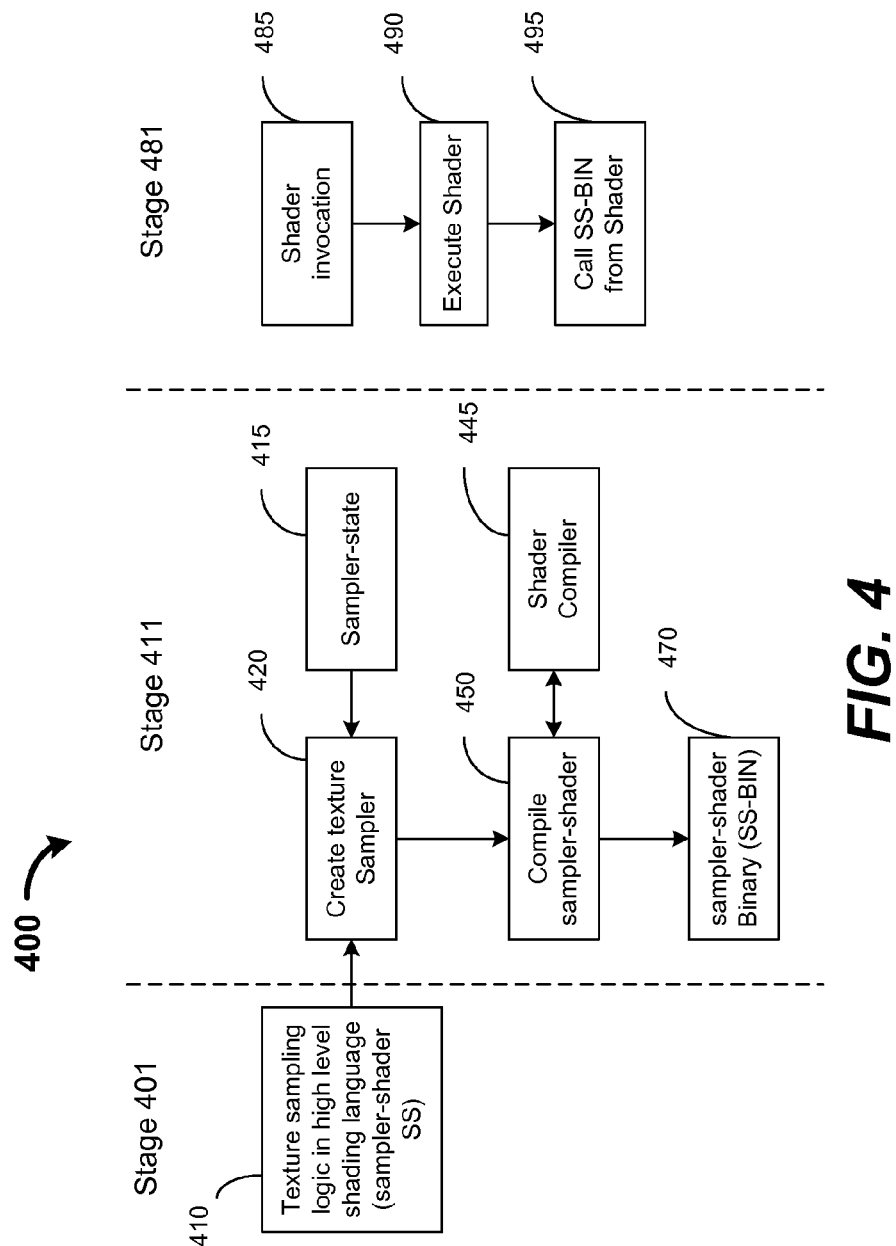
FIG. 4 illustrates a flow diagram depicting texture sampling process using a shader language in accordance with one embodiment.

An embodiment of a flow diagram 400 depicting generating and using texture samplers implemented using a high-level shader language is illustrated in FIG. 4. In one embodiment, the flow-diagram 400 depicts three stages—a stage 401, a stage 411, and a stage 481. In one embodiment, the stage 401 may represent an offline phase, the stage 411 may represent a preparation phase, and the stage 481 may represent a rendering phase.

In one embodiment, the stage 401 may comprise a texture sampler generation block 410. In one embodiment, the texture sampler generation block 410 may refer to generation of texture samplers such as the texture samplers 280-A to 280-K, which may be generated off-line and using a high level shader language such as Cg, HLSL, or GLSL as described in block 310.

In one embodiment, the stage 411 may comprise sampler state block 415, create sampler block 420, shader compiler block 445, compile sampler block 450, and sampler-shader binary (SS-BIN) block 470. In one embodiment, the sampler-state block 415 may represent input data values. In one embodiment, the input data values of the block 415 may determine the sampling operation performed by the texture sample of block 410. Block 420 depicts a create texture sampler block, which creates a texture sampler such as the 280-A to 280-K in response to receiving the texture sampler code from the block 410 and the input data values from the block 415.

Block 445 depicts a shader compiler block, which may retrieve the shading language of the texture sampler at an abstraction level and compile the texture sampler code into another level of abstraction. In one embodiment, the shader compiler block 445 may retrieve the texture sampler code from the create texture sampler block 420 and may cause compilation of the texture sampler code as depicted in compile sampler-shader block 450.

In one embodiment, in block 420, the texture sampler code may be created using a high-level shader language and the compile sampler-shader block 450 may compile the texture sampler code and generate an intermediate code such as assembly language code. In one embodiment, the compile sampler-shader block 450 may further comprise a machine-specific shader compiler such as a graphics shader compiler or a central processing unit (CPU) shader compiler, which may compile the intermediate code in assembly language into a machine-specific code. In one embodiment, a graphics processing unit or a central processing unit may support execution of the machine-specific code.

Block 470 depicts a sampler-shader binary (SS-BIN), which may be created as a result of compilation performed by the block 450. In one embodiment, the sampler-shader binary (SS-BIN) may be used by the shaders in the rendering phase.

In one embodiment, the stage 481 may represent a rendering phase in which the graphics elements such as the vertices or the whole primitives are rendered on a display devices after the shaders provide a shading effect to the graphics elements. In one embodiment, the stage 481 may comprise a shader invocation block 485, an execute shader block 490, and a call SS-BIN block 495. In one embodiment, the shader invocation block 485 may invoke shaders, such as the vertex shader 220, the hull shader 230, the domain shader 250, the geometry shader 260, and the pixel shader 270 as depicted in block 340.

In one embodiment, the execute shader block 490, may cause binaries of the shaders 220 to 270 to be executed. In one embodiment, a graphics processing unit may support execution of binaries of the shaders 220 to 270. In one embodiment, the call SS-BIN block 495 may call the binary files of one or more texture samplers 280-A to 280-K. In one embodiment, if the block 490 may execute the vertex shader 220, the block 495 may call SS-BIN of the texture samplers 280-A, 280-B, and 280-K. In one embodiment, if the block 490 may execute the hull shader 230, the block 495 may call SS-BIN of the texture samplers 280-A and 280-B. In one embodiment, if the block 490 may execute the domain shader 250, the block 495 may call SS-BIN of the texture sampler 280-B. In one embodiment, if the block 490 may execute the geometry shader 260, the block 495 may call SS-BIN of the texture samplers 280-A and 280-K. In one embodiment, if the block 490 executes the pixel shader 150, the block 495 may call SS-BIN of texture sampler 280-B and 280-K.

In one embodiment, the texture samplers 280-A to 280-K, in response to receiving a call, from the shaders 220 to 270 may perform texture sampling operation on the texture data and may generate texture samples. In one embodiment, the texture samples may be used by the shaders to create a shader effect on the graphics elements.

Figure 5:
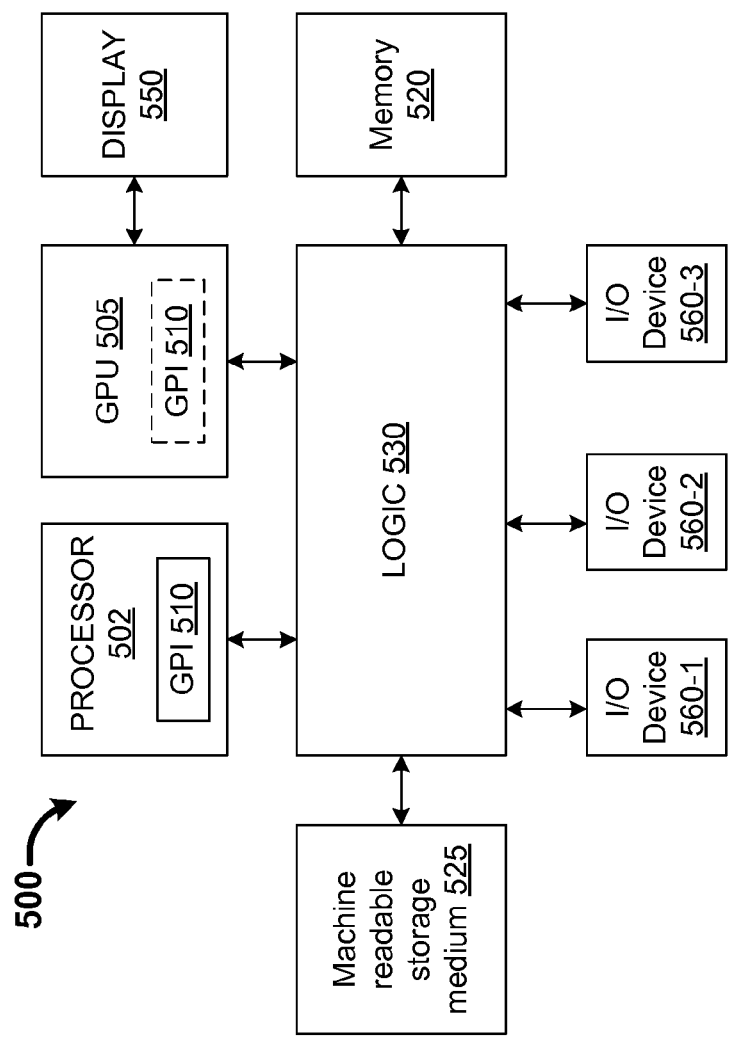
FIG. 5 illustrates a computer system 500 in which the texture sampling using a shader language may be implemented in accordance with one embodiment.

Referring to FIG. 5, a computer system 500 may include a general purpose processor 502 including a single instruction multiple data (SIMD) processor and a graphics processor unit (GPU) 505. The processor 502, in one embodiment, may perform enhancement operations in addition to performing various other tasks or store a sequence of instructions, to provide enhancement operations in machine readable storage medium 525. However, the sequence of instructions may also be stored in the memory 520 or in any other suitable storage medium. In one embodiment, the graphics application program interface GPI 510 may be supported by the processor 502 or the GPU 505.

While a separate graphics processor unit GPU 505 is depicted in FIG. 5, in some embodiments, the processor 502 may be used to perform enhancement operations, as another example. The processor 502 that operates the computer system 500 may be one or more processor cores coupled to logic 530. The logic 530 may be coupled to one or more I/O devices 560, which may provide interface the computer system 500. The logic 530, for example, could be chipset logic in one embodiment. The logic 530 is coupled to the memory 520, which can be any kind of storage, including optical, magnetic, or semiconductor storage. The graphics processor unit 505 is coupled through a frame buffer to a display 540.

In one embodiment, the graphics application program interface (GPI) 510 may be provisioned within the processor 502. However, in other embodiment, the graphics application program interface (GPI) 510 may be provisioned (shown by dotted box) within the GPU 505. In one embodiment, the GPI 510 may support a 3D pipeline and may implement texture samplers using high-level shader language. In one embodiment, the GPI 510 may implement the texture samplers 280-A to 280-K offline and using high-level shader languages and the texture samplers 280-A to 280-K so implemented may be compiled based on the target machine. In one embodiment, the texture samplers 280-A to 280-K may be called by one or more shaders 220 to 270 to get texture samples. In one embodiment, the shaders 220 to 270 may use the texture samples generated by the texture samplers 280-A to 280-K to create a shading effect on the graphics elements.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor or as a set of software instructions stored in a machine readable medium.

What is claimed is:

1. A method to perform texture sampling comprising:
implementing a texture sampler using a shader language,
generating a texture sampler binary code by compiling the texture sampler to a target machine based on input values provided to the texture sampler,
calling the texture sampler binary code from at least a first shader of a plurality of shaders while the first shader is invoked, and
generating shading effects on graphics elements using a first set of samples generated by the texture sampler while the texture sampler is called by the first shader, wherein the graphics elements comprise vertices of a line and a triangle.

2. The method of claim 1, further comprising
calling the texture sampler binary code from at least a second shader of the plurality of shaders while the second shader is invoked, and
generating shading effects on graphics elements using a second set of samples generated by the texture sampler while the texture sampler is called by the second shader.

3. The method of claim 1, wherein the implementing the texture sampler using the shader language is performed in an off-line phase prior to a preparation phase.

4. The method of claim 3, further comprising creating the texture sampler based on texture sampler code implemented off-line and the sampler state input values in a preparation phase, wherein sampler state input values determine the sampling operations performed by the texture sampler.

5. The method of claim 4, wherein the compiling the texture sampler to the target machine comprises,
generating an intermediate language code from the texture sampler implemented in the shader language using a shader compiler, and
generating a machine level code from the intermediate language code using a machine specific shader compiler.

6. The method of claim 5, wherein the shader language is a high-level language and the intermediate language code is an assembly level language.

7. The method of claim 1, further comprising calling the texture sampler binary code from the first shader while the first shader is executed in a rendering phase.

8. The method of claim 2, further comprising calling the texture sampler binary code from the second shader while the second shader is executed in a rendering phase.

9. The method of claim 2, further comprising associating a first texture sampler to the first shader and the second shader, wherein the first texture sampler is to generate samples for the first shader and the second shader.

10. A machine-readable storage medium comprising a plurality of instructions that in response to being executed by a computer system result in a processor:
implementing a texture sampler using a shader language,
generating a texture sampler binary code by compiling the texture sampler to a target machine based on sampler-state and sampler operation,
calling the texture sampler binary code from a first shader while the first shader is invoked, and
generating shading effects on graphics elements using a first set of samples generated by the texture sampler while the texture sampler is called by the first shader, wherein the graphics elements comprise vertices of a line and a triangle.

11. The machine-readable storage medium of claim 10, when the plurality of instructions are executed by the computer system further result in the processor
calling the texture sampler binary code from a second shader while the second shader is invoked, and
generating shading effects on graphics elements using a second set of samples generated by the texture sampler while the texture sampler is called by the second shader.

12. The machine-readable storage medium of claim 11, wherein the implementing the texture sampler using the shader language is performed in an off-line phase prior to a preparation phase.

13. The machine-readable storage medium of claim 11, when the plurality of instructions are executed by the computer system further result in the processor creating the texture sampler based on texture sampler code implemented off-line and the sampler state in a preparation phase, wherein the sampler state determines the sampling operations performed by the texture sampler.

14. The machine-readable storage medium of claim 13, wherein the compiling the texture sampler to the target machine comprises,
generating an intermediate language code from the texture sampler implemented in the shader language using a shader compiler, and
generating a machine level code from the intermediate language code using a machine specific shader compiler.

15. The machine-readable storage medium of claim 14, wherein the shader language is a high-level language and the intermediate language code is an assembly level language.

16. The machine-readable storage medium of claim 10, when the plurality of instructions are executed by the computer system further result in the processor calling the texture sampler binary code from the first shader while the first shader is executed in a rendering phase.

17. The machine-readable storage medium of claim 11, when the plurality of instructions are executed by the computer system further result in the processor calling the texture sampler binary code from the second shader while the second shader is executed in a rendering phase.

18. The machine-readable storage medium of claim 11, when the plurality of instructions are executed by the computer system further result in the processor associating a first texture sampler and a second texture sampler to a first shader and the second texture sampler and a third texture sampler to the second shader.

19. A system comprising:
a processor, wherein the processor is to support a plurality of graphics applications and one or more graphics application programmable interface,
a graphics processing unit, and
a memory coupled to the processor and the graphics processing unit,
wherein the one or more graphics application programmable interface is to comprise one or more texture samplers implemented using a shader language,
wherein a texture sampler binary code is generated by compiling the one or more texture samplers to a target machine based on sampler-state and sampler operation,
wherein the texture sampler binary code is called from a first shader while the first shader is invoked, and
wherein shading effects are generated on graphics elements using a first set of samples generated by the texture sampler while the texture sampler is called by the first shader, wherein the graphics elements comprise vertices of a line and a triangle.

20. The system of claim 19, wherein the memory comprises one or more buffers to store texture data, wherein the one or more texture samplers retrieve data values from the one or more buffers and generate texture samples.

21. The system of claim 19, wherein the one or more texture samplers implemented using the shader language are performed in an off-line phase prior to a preparation phase.

22. The system of claim 21, wherein the one or more texture samplers are created based on texture sampler code implemented off-line and the sampler state in a preparation phase, wherein the sampler state determines the sampling operations performed by the texture sampler.

23. The system of claim 22, wherein compiling the one or more texture samplers to a target machine comprises,
generating an intermediate language code from the texture sampler implemented in the shader language using a shader compiler, and
generating a machine level code from the intermediate language code using a machine specific shader compiler,
wherein the shader language is a high-level language and the intermediate language code is an assembly level language.

24. The system of claim 19, further comprises,
calling the texture sampler binary code from the first shader while the first shader is executed in a rendering phase, and
calling the texture sampler binary code from a second shader while the second shader is executed in a rendering phase.

25. The system of claim 19, further comprises associating
a first texture sampler and a second texture sampler to the first shader, and
the first texture sampler and a third texture sampler to a second shader, wherein the first texture sampler is to generate samples for the first shader and the second shader, wherein the second texture sampler is to generate samples for the first shader, and the third texture sampler is to generate samples for the second shader.

26. The system of claim 19, wherein the graphics processing unit is to support the one or more graphics application programmable interfaces,
wherein the one or more graphics application programmable interfaces are to comprise a graphics programmable pipeline, wherein the graphics programmable pipeline further comprises a plurality of shaders and one or more texture samplers implemented using a shader language,
wherein a texture sampler binary code of the one or more texture samplers is generated by compiling the one or more texture samplers to a target machine based on input values provided to the one or more texture samplers,
wherein the texture sampler binary code is called from at least one of the plurality of shaders while the at least one of the plurality of shaders is invoked, and
wherein the one or more texture samplers is to generate texture samples while the one or more texture samplers are called by the at least one of the plurality of shaders, wherein the at least one of the plurality of texture samplers is to use the texture samples to generate shading effects on graphics elements, wherein the graphics elements comprise vertices of a line and a triangle and a point.

* * * * *